US008787441B2

(12) United States Patent
Pasquier et al.

(10) Patent No.: US 8,787,441 B2
(45) Date of Patent: Jul. 22, 2014

(54) DEVICE AND METHOD FOR CODING AND DECODING VIDEO DATA AND DATA TRAIN

(75) Inventors: Frédéric Pasquier, Livre sur Changeon (FR); Sylvain Fabre, Dinge (FR); Bruno Garnier, Saint Jean sur Couesnon (FR)

(73) Assignee: Thomson Licensing, Boulogne-Billancourt (FR)

( * ) Notice: Subject to any disclaimer, the term of this patent is extended or adjusted under 35 U.S.C. 154(b) by 1148 days.

(21) Appl. No.: 11/988,407

(22) PCT Filed: Jul. 5, 2006

(86) PCT No.: PCT/EP2006/063905
§ 371 (c)(1),
(2), (4) Date: Jan. 7, 2008

(87) PCT Pub. No.: WO2007/006704
PCT Pub. Date: Jan. 18, 2007

(65) Prior Publication Data
US 2009/0279599 A1    Nov. 12, 2009

(30) Foreign Application Priority Data
Jul. 7, 2005 (FR) ...................................... 05 52096

(51) Int. Cl.
*H04N 7/26* (2006.01)
(52) U.S. Cl.
USPC ..................................... 375/240; 375/240.01
(58) Field of Classification Search
USPC ........................................................ 375/240
See application file for complete search history.

(56) References Cited

U.S. PATENT DOCUMENTS 7,680,187 B2 *    3/2010    Kitamura ................. 375/240.16
7,839,930 B2 *    11/2010   Holcomb et al. ........ 375/240.13
(Continued)

FOREIGN PATENT DOCUMENTS

JP    2004248255        9/2004
JP    2004248255 A      9/2004
(Continued)

OTHER PUBLICATIONS

C. Gomila et al: "New Features and Applications of the H.264 Video Coding Standard", Information Technology: Research and Education, 2003, Proceedings. ITRE2003, Int'l Conference on Aug. 11-13, 2003, Piscataway,NJ USA IEEE, Aug. 11, 2003; pp. 6-10.
Search Report Dated Mar. 9, 2007.

*Primary Examiner* — Edan Orgad
*Assistant Examiner* — Emmanuel Maglo
(74) *Attorney, Agent, or Firm* — Tutunjian & Bitetto, P.C.

(57) ABSTRACT

The invention relates to a device for coding video data comprising means to code a video stream as groups of pictures, each group of pictures comprising at least one description unit relevant to the coding of the said group of pictures. According to the invention, the coding device comprises means to insert in the stream of data at least one message indicating whether the description unit of the current group of pictures is identical to the description unit relevant to the preceding group of pictures. The invention also relates to a device for decoding video data comprising means to decode a stream of data coded with a device according to one of the preceding claims. According to the invention, the decoding device comprises
   means to analyze the said messages,
   means to decode the at least one next description unit if the said message indicates that this unit is different from the preceding description unit, otherwise, if it is identical, not to decode it.

12 Claims, 4 Drawing Sheets

(56) References Cited

U.S. PATENT DOCUMENTS

| | | |
|---|---|---|
| 2004/0218668 A1 | 11/2004 | Hannuksela et al. |
| 2004/0218816 A1 | 11/2004 | Hannuksela |
| 2005/0175098 A1* | 8/2005 | Narasimhan et al. .... 375/240.12 |
| 2005/0254526 A1* | 11/2005 | Wang et al. .................. 370/503 |
| 2006/0056705 A1 | 3/2006 | Kadono et al. |
| 2008/0170564 A1* | 7/2008 | Shi et al. ....................... 370/386 |

FOREIGN PATENT DOCUMENTS

| | | |
|---|---|---|
| JP | 2005311855 | 11/2005 |
| JP | 2005311855 A | 11/2005 |
| WO | WO2004098197 | 11/2004 |

* cited by examiner

DEVICE AND METHOD FOR CODING AND DECODING VIDEO DATA AND DATA TRAIN

This application claims the benefit, under 35 U.S.C.§365 of International Application PCT/EP2006/063905, filed Jul. 5, 2006, which was published in accordance with PCT Article 21(2) on Jan. 18, 2007 in English and which claims the benefit of French patent applications No. 0552096, filed Jul. 7, 2005.

The invention relates to a device and a method for coding and decoding video data as well as a data train.

The invention is more particularly addressed at the coding standards in which the coded pictures are transmitted with a certain amount of information allowing them to be readily decoded.

Compression standards such MPEG-2 and more recently H264 transmit the coded pictures in the form of a group of pictures (GOP), the latter also comprising information describing the structure of the group of pictures. This information thereafter serving the decoder for the decoding of the pictures.

In the H264 standard, the coded video stream comprises a series of header type units describing each group of pictures (GOP) and each picture of the GOP. These headers are dubbed NALs (the acronym standing for "Network Adaptation Layer"). These headers can in particular be NALs of SPS type (the acronym standing for "Sequence Parameter Set") or NALs of PPS type (the acronym standing for "Picture Parameter Set"). These NALs are transmitted at the start of the GOP to which they pertain. Each GOP begins with an NAL of SPS type, then an NAL of PPS type, then an NAL of IDR type (the acronym standing for "instantaneous decoding refresh") and thereafter a series of type I, B or P pictures. The NALs of PPS type can also be inserted into the middle of a GOP so as to be used by following pictures, it is possible in particular to have an NAL of PPS type before each NAL of picture type. An NAL of SPS type indicates for a series of pictures of a GOP, their profile and their level (as it is known in the H264 standard).

An NAL of PPS type indicates the type of entropy encoding used (CABAC or CAVLC) but also the base quantization interval.

The NALs of SPS and PPS type are emitted at the start of each GOP so as to ensure service quality but generally, these same SPSs and PPSs are emitted numerous times, that is to say one and the same SPS and one and the same PPS can serve for the decoding of pictures over several GOPs. The H264 standard envisages that their decoding is performed each time but this decoding is relatively expensive time-wise and unnecessary, these syntax elements having been read and decoded potentially during GOPs emitted and decoded previously.

The invention therefore proposes a coding of the data which allows more effective decoding. The invention is not limited to an H264 type coding but can also apply to data streams in which redundant data are transmitted and do not require a decoding to allow the decoding of the useful data. These redundant data can in particular be due to the type of coding used and in particular when the structure of the data is reproduced several times in the stream, it is possible that the headers are related to the coding structure and are not different for each group of associated data if the structure is preserved throughout the stream.

For this purpose, the invention relates to a device for coding video data comprising means to code a video stream as groups of pictures, each group of pictures comprising at least one description unit relevant to the coding of the said group of pictures.

According to the invention, the device comprises means to insert in the stream of data at least one message indicating whether the description unit of the current group of pictures is identical to the description unit relevant to the preceding group of pictures.

The insertion of messages can advantageously make it possible not to decode all the data received during the decoding of these data by a decoding device. The insertion of messages during the coding of data must however be compatible with a subsequent decoding of the coded data. Preferably, the inserted message must hence be understood by the decoder or ignored by the latter without thereby impeding the decoding of the data. The data train thus encoded by a coding device in accordance with the invention is preferably compatible with the decoding device.

According to an advantageous embodiment, the means to insert the said message insert the said message at the start of each group of pictures.

In this way, this can speed up the decoding of the data during their reception.

Preferably, each group of pictures comprises two description units for each group of pictures, the first of the said description units being relevant to the coding mode used for each picture of the group and the second description unit being relevant to coding parameters used by the coding device.

Preferably, the device comprises means of recording at least one of the said description units, intended to record at least one description unit when it is new with respect to the description unit of the preceding group of pictures.

Advantageously, the coding device complies with the H264 coding standard.

Advantageously, the said message is an SEI type message.

The SEI messages are recognized by the H264 standard. The use of an SEI message can hence make it possible to retain compatibility with coders and decoders in accordance with the H264 standard and implementing the invention. Thus, when a decoder receives the message, either it succeeds in interpreting it, or it ignores it and in the latter case does not implement the invention.

According to a preferred embodiment, the said message indicates for each description unit which of the description units is identical to the corresponding description unit relevant to the preceding group.

According to a second aspect, the invention also relates to a method for coding video data coding a stream of pictures as groups of pictures, each group of pictures comprising at least one description unit relevant to the coding of the said group of pictures. According to the invention, the coding method comprises a step of insertion into the stream of data of at least one message indicating whether the description unit of the current group of pictures is identical to the description unit relevant to the preceding group of pictures.

According to a third aspect, the invention also relates to a device for decoding video data comprising means to decode a stream of data coded with a device according to one of the preceding claims. According to the invention the decoding device comprises
   means to analyse the said messages,
   means to decode the at least one next description unit if the said message indicates that this unit is different from the preceding description unit, otherwise, if it is identical, not to decode it.

Preferably, the decoding device comprises means of recording at least one of the said description units, intended to record at least one description unit received when it is new.

According to a fourth aspect, the invention also relates to a method for decoding video data coded with a device according to one of the preceding claims. According to the invention, the decoding method comprises the steps of analysis of the said messages, of decoding of the at least one description unit if the said message indicates that this unit is different from the preceding description unit, otherwise, if it is identical, of non-decoding of this unit.

According to a fifth aspect, the invention also relates to a digital data train comprising digital data groups, each group comprising a field of a first type, at least one field of a second type and a plurality of fields of a fourth type. According to the invention, the field of first type indicates whether the field of second type is identical or different from the field of second type of the temporally preceding group.

The invention will be better understood and illustrated by means of wholly nonlimiting, advantageous exemplary embodiments and modes of implementation, with reference to the appended figures in which.

The modules represented in the various figures are functional units, which may or may not correspond to physically distinguishable units. For example, these modules or some of them may be grouped together in a single component, or constitute functionalities of one and the same software. Conversely, some modules may possibly be composed of separate physical entities.

The description below is based on a coding of data in accordance with the H264 standard. This exemplary implementation is not limited to a coding of this type. The invention actually relates to any type of coding in which information is inserted into the stream so as to facilitate its subsequent use.

In the prior art, the structure of a GOP comprises NALs of SPS and PPS type then a series of NALs coding the pictures of the GOP coded according to the type IDR, I, B or P. The NALs coding the pictures making reference to the NALs of SPS and PPS type during the decoding of the picture NALs.

Figure 1:
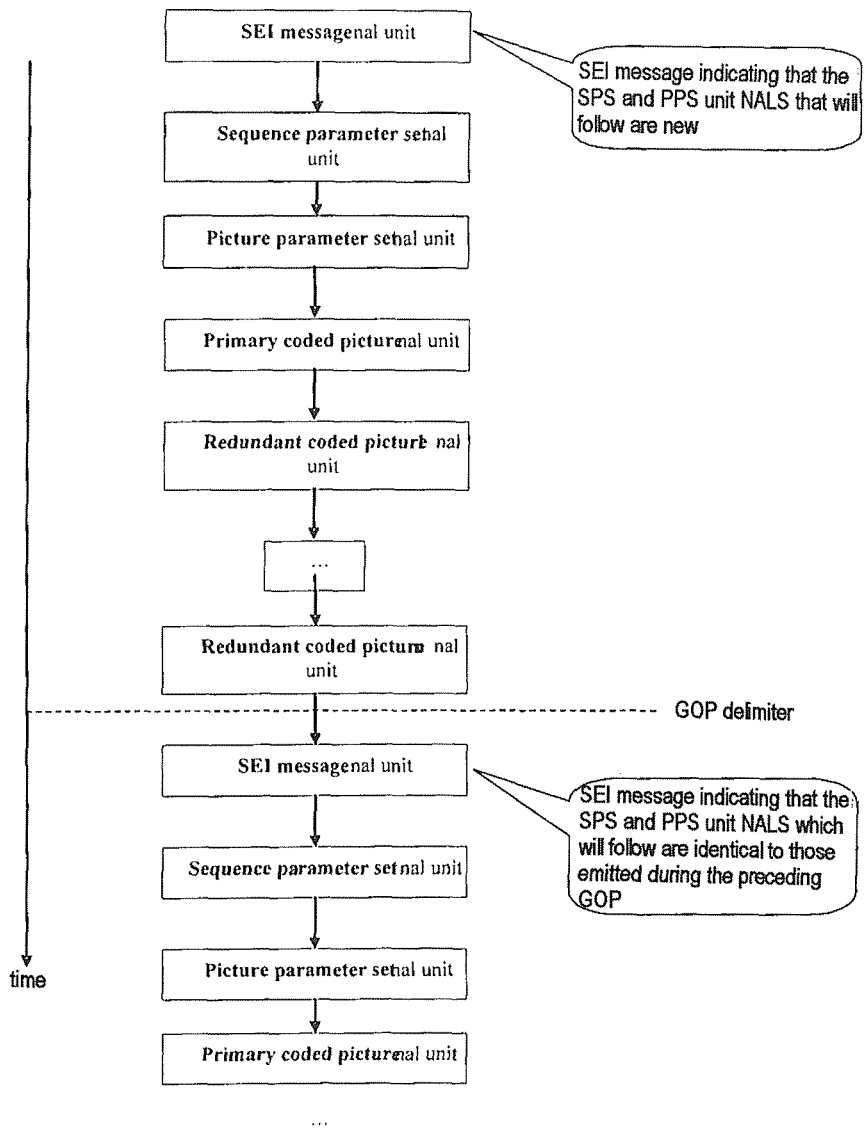
FIG. 1 represents the structure of the GOP according to the invention.

According to the embodiment described in FIG. 1, the H264 type coder inserts at the start of each GOP an SEI type message. This message relates to the NALs of SPS and PPS type which immediately follow it.

The range of an SEI message is limited to the pair of SPS and PPS NALs which follow this SEI message, an SEI message is hence transmitted before each transmission of SPS and PPS headers.

The table below illustrates the payload part of an SEI message, using a type of payload of type 6, corresponding in the H264 standard to a payload of type "user_data_unregistered", represented in the table below.

| user_data_unregistered( payloadSize ) { | Descriptor |
|---|---|
| uuid_iso_iec_11578 | u(128) |
| for( i = 16; i < payloadSize; i++ ) | |
| user_data_payload_byte | b(8) |
| } | | the 128-bit word "uuid_iso_iec_11578" indicates to the decoder during the decoding phase the type of message. The H264 standard specifies a certain number of values for this word as a function of its meaning. One of these values indicates that it involves a message of the type "user_data_payload".

the word "user_data_payload_byte" is an 8-bit word making up a part of the SEI message. This word is used to code the data relevant to proprietary applications and in particular here to code the data relevant to the invention, as coded below.

PayloadSize is equal to 17 bytes, including 16 for UUID and 1 for user_data_payload_byte.

The word "user_data_payload_byte" is coded thus:

0x00: the 2 NAL units SPS and PPS are both different from those used during the decoding of the preceding GOP, 0x01: the NAL unit SPS is new but the NAL unit PPS is identical to that used during the decoding of the preceding GOP, 0x02: The NAL unit PPS is new but the NAL unit SPS is identical to that used during the decoding of the preceding GOP, 0x03: the 2 NAL units SPS and PPS are both identical to those used during the decoding of the preceding GOP.

Figure 2:
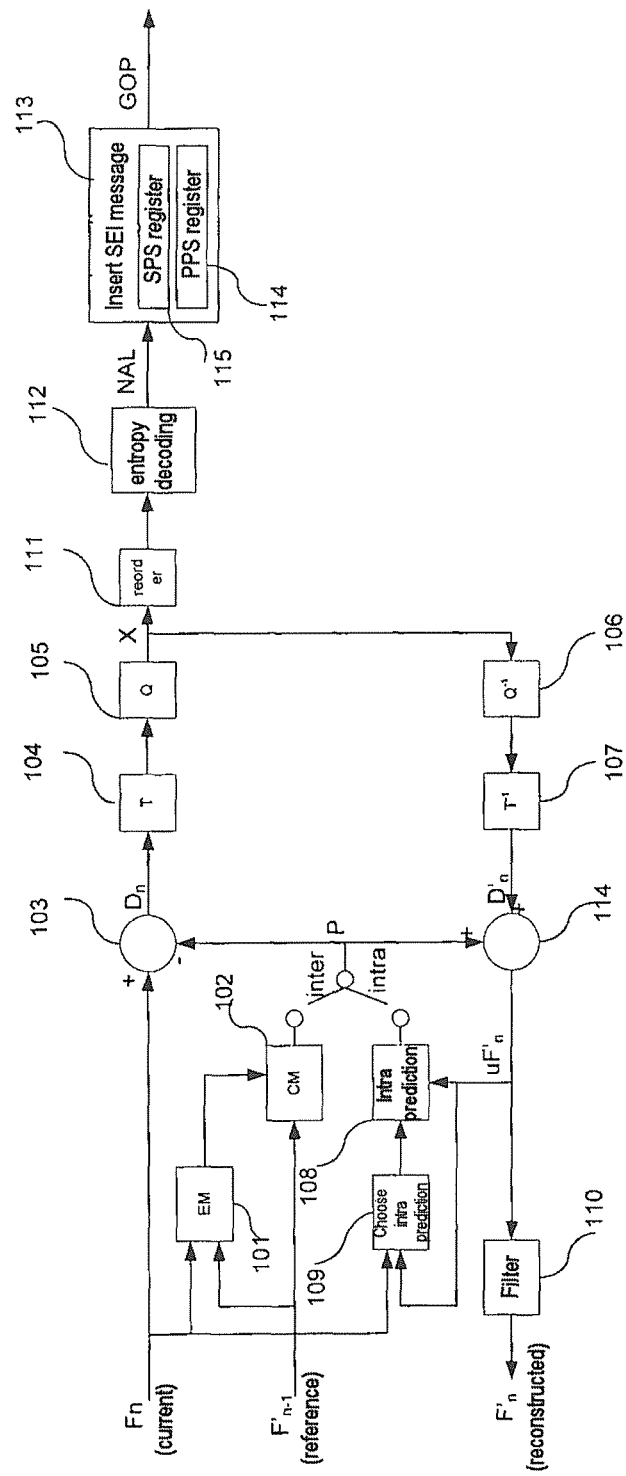
FIG. 2 represents a coding device according to the invention.

FIG. 2 represents a coding device according to the preferred embodiment of the invention.

A current frame $F_n$ is presented at the input of the coder so as to be coded therein. This frame is coded as a group of pixels called macroblocks, corresponding to groups of 16*16 pixels. Each macroblock is coded in intra or inter mode. Whether it be in intra mode or in inter mode, a macroblock is coded based on a reconstructed frame. A module 109 decides the coding mode in intra mode of the current picture, as a function of the content of the picture. In Intra mode, P (represented in FIG. 2) is composed of samples of the current frame Fn which have been previously encoded, decoded and reconstructed (uF'n in FIG. 2, u signifying unfiltered). In inter mode, P is constituted on the basis of a motion estimation based on one or more frames $F'_{n-1}$.

A motion estimation module 101 establishes an estimation of motion between the current frame Fn and at least one preceding frame F'n–1. On the basis of this motion estimation, a motion compensation module 102 produces a frame P when the current picture Fn must be coded in inter mode.

A subtracter 103 produces a signal Dn, the difference between the picture Fn to be coded and the picture P. Thereafter this picture is transformed by a DCT transformation in a module 104. The transformed picture is thereafter quantized by a quantization module 105. Thereafter, the pictures are reorganized by a module 111. An entropy coding module 112 of CABAC type (the acronym standing for "Context-based Adaptive Binary Arithmetic Coding") thereafter encodes each picture.

Modules 106 and 107 respectively for inverse quantization and inverse transformation make it possible to reconstitute a difference D'n after transformation and quantization then inverse quantization and inverse transformation.

When the picture is coded in intra mode, according to the module 109, an intra prediction module 108 codes the picture. A picture uF'n is obtained at the output of an adder 114, as the sum of the signal D'n and of the signal P. This module 108 also receives as input the unfiltered reconstructed picture F'n.

A filtering module 110 makes it possible to obtain the filtered reconstructed picture F'n on the basis of the picture uF'n.

At the output of the entropy coding module 112, the pictures thus coded in the form of NALs are transmitted to a module 113, with the associated NALs of SPS and/or PPS type.

The module 113 comprises two registers 115 and 114 intended to record the NALs of SPS and PPS type. These two registers are able to record several NALs of SPS and PPS type. The H264 standard in particular envisages the recording of 32 SPS NALs and of 256 PPS NALs making it possible to record the SPS and PPS NALs over several GOPs.

When a new GOP is received in the module 113, the SPS and PPS NALs received are then compared respectively with the NALs recorded in the registers 115 and 114. If the new SPS and PPS NALs are different from the last NALs recorded, then the new SPS and PPS NALs are written respectively in the registers 115 and 114. The module 113 thereafter prepares an SEI message that it inserts at the start of the GOP before transmitting the GOP as output.

This SEI message conforms to the SEI message described in FIG. 1, according to whether the SPS and PPS NALs are or are not new.

Figure 3:
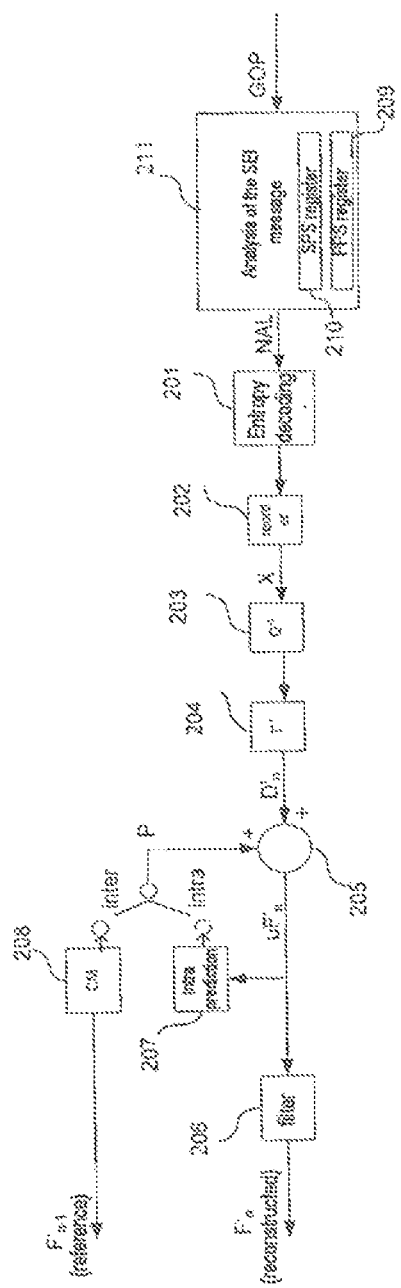
FIG. 3 represents a decoding device according to the invention.

FIG. 3 represents a decoding device according to the invention.

A module 211 receives as input the GOP to be decoded. This module 211 has available a register 210 for recording at least one NAL of SPS type and a register 209 for recording at least one NAL of PPS type.

When the module 211 receives a GOP, it decodes the SEI message situated at the start of the GOP. A detailed flowchart of the decoding done in the module 211 is given in FIG. 4.

Figure 4:
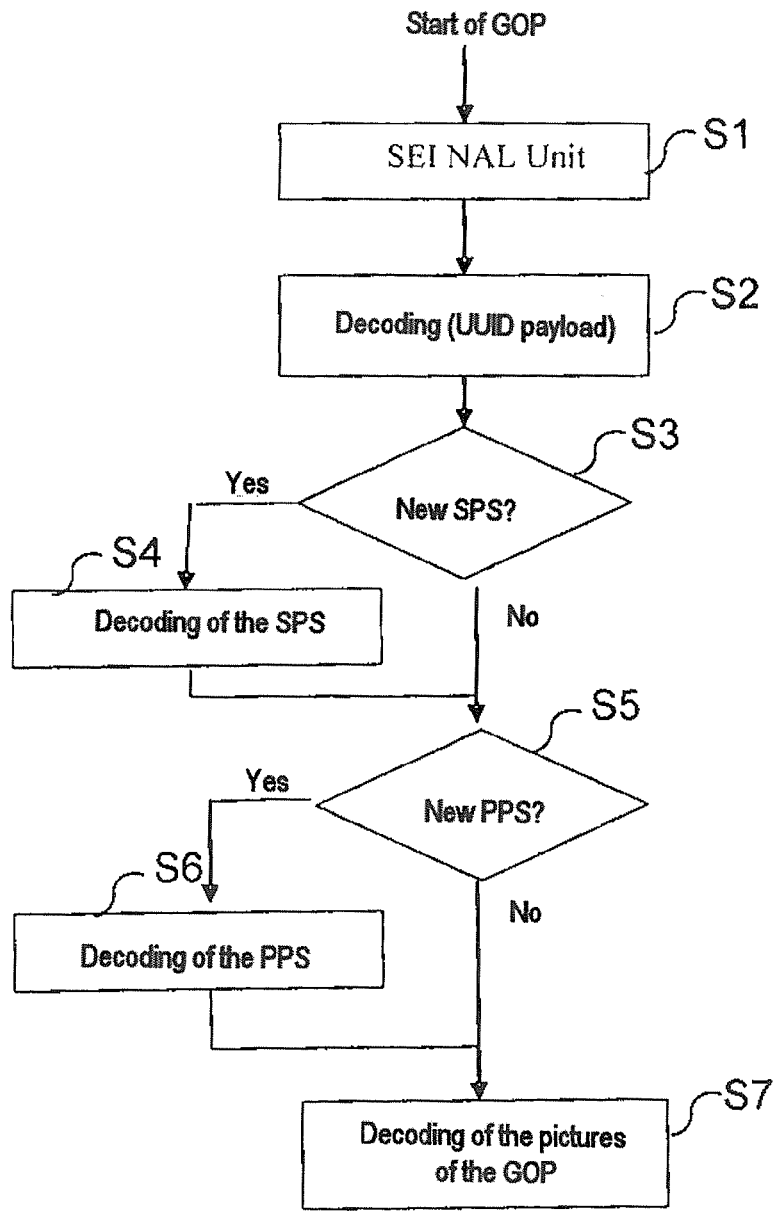
FIG. 4 represents a flowchart of the analysis of the GOP during the decoding of the GOP.

As a function of the analysis of the SEI message, the NALs of PPS and SPS type are decoded or ignored as indicated in FIG. 4. If they are defined as new in the SEI message, they are decoded, otherwise they are not decoded. The SPS and PPS NALs are recorded respectively in the registers 210 and 209 if they are detected as new. Specifically, they are then decoded and can hence be recorded in the appropriate registers. Specifically, during the reception of the following GOP, if the SEI message appertaining to this GOP indicates that the SPS and PPS NALs or one of them is not new with respect to the SPS and PPS NALs of the preceding GOP or of a yet earlier GOP, it is important to be able to compare them with the values of the SPSs and PPSs of at least one preceding GOP.

When this SEI message is decoded and when the values of the SPS and PPS NALs are available, either by consultation of the register in the case where they are not new, or by decoding of the current values if they are new, the NALs of picture type are transmitted to an entropy decoding module 201. The entropy decoding module 201 performs the inverse operation to the module 112 of FIG. 2. Thereafter, the data are transmitted to a reordering module 202 so as to obtain a set of coefficients. These coefficients then undergo an inverse quantization in the module 203 and an inverse DCT transformation in the module 204 at the output of which we obtain the macroblocks D'n, D'n being a deformed version of Dn. A predictive block P is added to D'n, by an adder 205, to reconstruct a macroblock uF'n. The block P is obtained after motion compensation, performed by a module 208, of the preceding decoded frame, during a coding in inter mode or after intra prediction of the macroblock uF'n, by a module 207, in the case of a coding in intra mode. A filter 206 is applied to the signal uF'n so as to reduce the effects of the distortion and the reconstructed frame F'n is created on the basis of a series of macroblocks.

FIG. 4 represents a flowchart of the operation of a GOP decoding method according to the invention.

During a step S1, the SEI message is read. This message constitutes the first NAL of the current GOP. During a step S2, this SEI message is decoded. More particularly and in relation to the invention, the field "user_data_payload_byte" is decoded so as to investigate whether the SPS and PPS NALs are new.

We then test during a step S3 the content of this field so as to see if the SPS NAL is identical or not to that of the preceding GOP. If the SEI message is equal to the value 0×00 or 0×01 then the SPS NAL is new and we go to a step S4. During this step S4, we decode the SPS NAL and we go to a step S5. Otherwise, if during the test of step S3, the SPS NAL is not new, we then go to step S5 without going via step S4. During step S5, we test the SEI message to determine whether the PPS NAL of the current GOP is identical or not to that of the preceding GOP. If the SEI message is equal to the value 0×00 or 0×02 then the PPS NAL is new and we go to a step S6. During this step S6, we decode the PPS NAL and we go to a step S7. Otherwise, if during the test of step S5, the SPS NAL is not new, we then go to step S7 without going via step S4. During step S7, we decode the pictures of the GOP based on the values of the PPSs and SPSs decoded or recovered from the preceding GOP.

In this way, when the SPS and PPS NALs are not new with respect to the SPS and PPS NALs of at least the immediately preceding GOP, steps S4 and S6 are not performed, thereby affording a time saving and simplicity of decoding at the level of the entropy decoding.

The invention claimed is:

1. Device for coding video data comprising means to code a video stream as groups of pictures, each group of pictures comprising a unit of a first type, at least one unit of a second type and a plurality of units of a fourth type, wherein said unit of the first type comprises at least one message, wherein said at least one unit of the second type is at least one description unit comprising parameters relative to coding of said group of pictures, wherein said plurality of units of the fourth type comprise data relative to the coded group of pictures, and wherein said device comprises:

means to insert in the stream of data, before said at least one description unit of a current group of pictures, in said unit of the first type, said at least one message, wherein the at least one message indicates whether said parameters relative to the current group of pictures included in the at least one description unit of the current group of pictures are identical to parameters relative to a temporally preceding group of pictures included in a corresponding preceding description unit.

2. Coding device according to claim 1 wherein the means to insert the at least one message inserts the at least one message in said unit of the first type at the start of each group of pictures.

3. Coding device according to claim 1 wherein each group of pictures comprises two description units for each group of pictures, the first of the said description units comprising parameters relative to the coding mode used for each picture of the group and the second description unit comprising parameters relative to coding parameters used by the coding device and wherein a first message of said group of pictures is set when the parameters of said first description unit are identical to the parameters of said first description units of the preceding group of pictures and said first message of said group of pictures is reset when the parameters of said first description unit are different from the parameters of said first description units of the preceding group of pictures and wherein a second message of said group of pictures is set when the parameters of said second description unit are identical to the parameters of said second description units of the preceding group of pictures and said second message of said group of pictures is reset when the parameters of said second description unit are different from the parameters of said second description units of the preceding group of pictures.

4. Coding device according to claim 1 wherein it comprises means of recording at least one of the said description units, intended to record at least one description unit when it is new with respect to the description unit of the preceding group of pictures.

5. Coding device according to claim 1 wherein it complies with the H264 coding standard.

6. Coding device according to claim 5 wherein said unit of the first type is of SEI type.

7. Device according to claim 1, wherein the said at least one message indicates for each description unit which of the description units is identical to the corresponding description unit comprising parameters relative to the preceding group of pictures.

8. Method for coding video data coding a stream of pictures as groups of pictures, each group of pictures comprising a unit of a first type, at least one unit of a second type and a plurality of units of a fourth type, wherein said unit of the first type comprises at least one message, wherein said at least one unit of the second type is at least one description unit comprising parameters relative to coding of the said group of pictures, wherein said plurality of units of the fourth type comprise data relative to the coded group of pictures, and wherein the method comprises a step of insertion into the stream of data, before said at least one description unit in said unit of the first type of a current group of pictures, of the at least one message, wherein said at least one message indicates whether the parameters relative to the current group of pictures included in the description unit of the current group of pictures are identical to the parameters relative to a temporally preceding group of pictures included in a corresponding preceding description unit.

9. Device for decoding video data comprising means to decode a stream of data coded with a device according to claim 1, wherein it comprises means to analyse the at least one message, means to decode the at least one next description unit if the at least one message indicates that this unit is different from the preceding description unit, otherwise, if it is identical, not to decode it.

10. Decoding device according to claim 9 wherein it comprises means of recording at least one of the said description units, intended to record at least one description unit received when it is new.

11. Method for decoding video data coded with a device according to claim 1, wherein it comprises the steps of analysis of the at least one message, of decoding of the at least one description unit if the at least one message indicates that this unit is different from the preceding description unit, otherwise, if it is identical, of non-decoding of this unit.

12. A non-transitory signal medium comprising a digital data train stored on the medium, said digital data train including digital data groups, each group comprising a unit of a first type, at least one unit of a second type and a plurality of units of a fourth type, wherein said unit of the first type comprises a message, wherein said at least one unit of the second type is at least one description unit comprising parameters relative to coding of the said group of pictures, wherein said plurality of units of the fourth type comprise data relative to the coded group of pictures, and wherein the message of said unit of the first type indicates whether the at least one description unit is identical or different from the at least one description unit of a temporally preceding group.

* * * * *